(12) United States Patent
Allston et al.

(10) Patent No.: US 6,866,020 B2
(45) Date of Patent: Mar. 15, 2005

(54) VACUUM MANAGEMENT SYSTEM FOR ENGINE WITH VARIABLE VALVE LIFT

(75) Inventors: Brian K. Allston, Rochester, NY (US); James F. Burkhard, Churchville, NY (US)

(73) Assignee: Delphi Technologies, Inc., Troy, MI (US)

( * ) Notice: Subject to any disclaimer, the term of this patent is extended or adjusted under 35 U.S.C. 154(b) by 164 days.

(21) Appl. No.: 10/170,850

(22) Filed: Jun. 12, 2002

(65) Prior Publication Data

US 2003/0230280 A1 Dec. 18, 2003

(51) Int. Cl.[7] .............................. F02D 11/10; F01L 9/04; F02M 25/07; F02M 25/08
(52) U.S. Cl. .................... 123/399; 123/90.15; 123/520; 123/568.21
(58) Field of Search ........................... 123/90.11, 90.15, 123/399, 568.21

(56) References Cited

U.S. PATENT DOCUMENTS

| | | | | |
|---|---|---|---|---|
| 6,009,862 A | * | 1/2000 | Wanat et al. | 123/568.22 |
| 6,250,283 B1 | * | 6/2001 | Russell et al. | 123/361 |
| 6,397,814 B1 | * | 6/2002 | Nagaishi et al. | 123/348 |
| 6,412,455 B1 | * | 7/2002 | Ogiso et al. | 123/90.11 |
| 6,439,175 B2 | * | 8/2002 | Arai et al. | 123/90.11 |
| 6,546,910 B2 | * | 4/2003 | Tanaka et al. | 123/348 |
| 6,571,782 B2 | | 6/2003 | Brosseau et al. | 123/568.18 |

* cited by examiner

Primary Examiner—Tony M. Argenbright
(74) Attorney, Agent, or Firm—Jimmy L. Funke

(57) ABSTRACT

A vacuum management system for an engine with variable valve lift includes a vacuum control valve at the entrance to the intake manifold to increase vacuum within the manifold as needed and preferably only when it can be done without impairing fuel economy or engine performance. Vacuum may then be used for any of various vacuum-assisted devices and functions, for example, boosting a vehicle braking system. The numerical relationships among important operating parameters are determined in a laboratory, and a programmable engine control module (ECM} is provided with algorithms and tables of such values by which the ECM is able to vary valve lift and vacuum control valve position to provide optimum flow across the intake valves and optimum manifold vacuum under all engine operating conditions.

9 Claims, 3 Drawing Sheets

VACUUM MANAGEMENT SYSTEM FOR ENGINE WITH VARIABLE VALVE LIFT

TECHNICAL FIELD

The present invention relates to internal combustion engines; more particularly, to such engines wherein devices for variably controlling the lift of intake valves are the primary throttling means of the engine; and most particularly, to a system for providing and managing manifold vacuum in such an engine to optimize fuel economy and enable vacuum-assisted devices such as a brake booster.

BACKGROUND OF THE INVENTION

Fuel-injected internal combustion engines are well known, especially for automotive applications. Torque output of such an engine is typically controlled by moderating airflow into the engine via a throttle device. The throttle, usually a butterfly valve disposed at the entrance to the engine intake manifold, may be directly actuated by a driver's foot pedal or may be electronically governed through a digital or analog controller. Under typical driving conditions, the engine is substantially throttled. Because the engine is a positive displacement pump, a vacuum is created in the intake manifold downstream of the throttle valve.

Recently, some engines are known to be provided with means for varying the lift of one or more engine cylinder intake valves to improve fuel economy (also known as variable valve actuation, VVA, and referred to herein as variable valve lift, VVL). Typically, the lift of a plurality of valves in a multiple-cylinder engine is reduced or modulated during operating periods of low engine load to reduce fuel consumption, the amount of lift being directed by an engine control module (ECM) responsive to various performance inputs, operator pedal position, and programmed algorithms.

In some such engines, it is known to control engine torque by directly utilizing the variable valve lift means to controllably throttle the flow of air into each of the individual cylinders, thereby obviating the need for any conventional throttle valve at the inlet to the intake manifold.

A first unfavorable consequence of eliminating a manifold throttle valve is that the air pressure within the manifold is substantially the same as atmospheric pressure outside the engine; i.e., there is no useful level of manifold vacuum. However, a variety of standard engine and other automotive subsystems have evolved over many years which utilize vacuum as the source of actuation. The engine intake manifold has previously been a "free" source of vacuum for operating such devices and functions, which may include brake boosting, evaporative canister purging, exhaust gas recirculation, and HVAC systems among others. Providing an auxiliary vacuum pump for auxiliary automotive devices adds cost to a vehicle, consumes valuable onboard space, and parasitically decreases fuel economy. Engine functions, such as improving fuel preparation for cold starting, inducing exhaust gas recirculation into the intake manifold, and reducing cylinder-to-cylinder air volume differences at light engine loads, require manifold vacuum and cannot be accomplished by addition of an auxiliary vacuum pump.

A second unfavorable consequence of eliminating a manifold throttle valve is that fuel economy typically is suboptimal when there is no manifold vacuum.

It is a principal object of the present invention to provide a substantially non-parasitic system for creating and managing vacuum for operating vacuum-assisted devices and functions in a vehicle powered by a VVL-equipped engine wherein primary throttling has heretofore been provided exclusively by variable valve lifting.

It is a further object of the invention to provide such a system whereby fuel economy is improved.

It is a still further object of the invention to provide a failsafe means for operating a VVL-equipped and throttled engine in the event that the VVL control fails and the valves assume a full-lift mode.

SUMMARY OF THE INVENTION

Briefly described, a vacuum creation and management system for an engine with variable valve lift includes a vacuum control valve at the entrance to the intake manifold connected to a programmable engine control module (ECM) to increase vacuum within the manifold as needed. Vacuum may then be used for any of various vacuum-assisted devices and functions, for example, boosting a vehicle braking system. Numerical values for important operating parameters are determined in a laboratory, and the ECM is provided with algorithms and tables of such values according to which the ECM varies valve lift and throttle valve position to provide optimum manifold vacuum under all engine operating conditions.

BRIEF DESCRIPTION OF THE DRAWINGS

These and other features and advantages of the invention will be more fully understood and appreciated from the following description of certain exemplary embodiments of the invention taken together with the accompanying drawings, in which.

DESCRIPTION OF THE PREFERRED EMBODIMENTS

Figure 1:
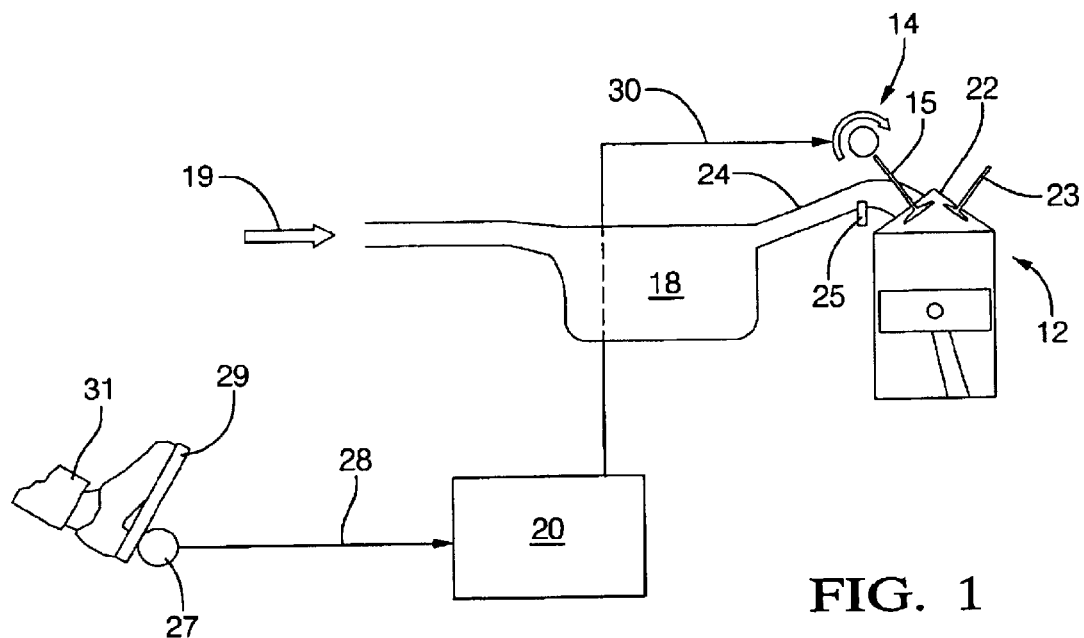
FIG. 1 is a schematic diagram of a known VVL-equipped fuel-injected internal combustion engine wherein the sole throttle means is the variable valve lift means.

Referring to FIG. 1, a fuel-injected engine 12 with variable valve lift (VVL) means 14 for actuation of intake valve 15 includes a programmable engine control module 20 (ECM). (It should be understood that engine 12 is a multiple-cylinder engine and that valve 15 is individually representative of a plurality of engine valves in a plurality of engine cylinders.) Intake manifold 18 is connected for air flow 19 to engine head 22 via runner 24 which supports a conventional fuel injector 25. Head 22 supports intake valve 15 and exhaust valve 23. The ECM is electrically connected to VVL lift means 14 via first lead 30 for varying the lift of intake valve 15. Engine throttling and consequent torque control is provided by varying the lift of the intake valves via ECM 20 in response to engine load request from an electronic pedal module 27 connected via second lead 28 and responsive to positional input of accelerator pedal 29 from operator 31. ECM 20 may be further connected to other engine and vehicle inputs and may be provided with algorithms for determining the instantaneous performance of engine 12. Typically, during operation of engine 12 as shown in FIG. 1 there is substantially no vacuum in manifold 18.

Figure 2:
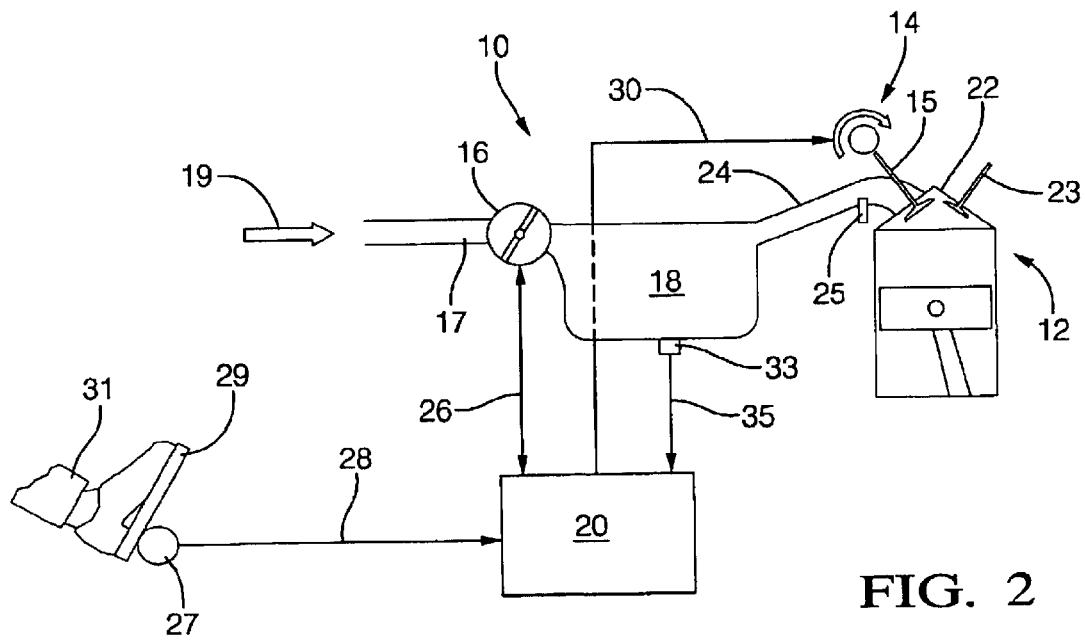
FIG. 2 is a schematic diagram of the engine shown in FIG. 1, showing a manifold vacuum control system in accordance with the invention.

Referring to FIG. 2, a vacuum system 10 in accordance with the invention includes an engine 12 and components substantially as shown in FIG. 1. In addition, a controllable vacuum control valve 16 is disposed in the entrance 17 to intake manifold 18 and is connected to ECM 20 by third lead 26 for sensing the rotary position thereof and for actuating valve 16 to move to a different rotary position in response to an algorithm in the ECM. Manifold 18 is further provided with a pressure sensor 33 connected to ECM 20 via fourth lead 35 for sensing pressure (vacuum) therein.

Figure 3:
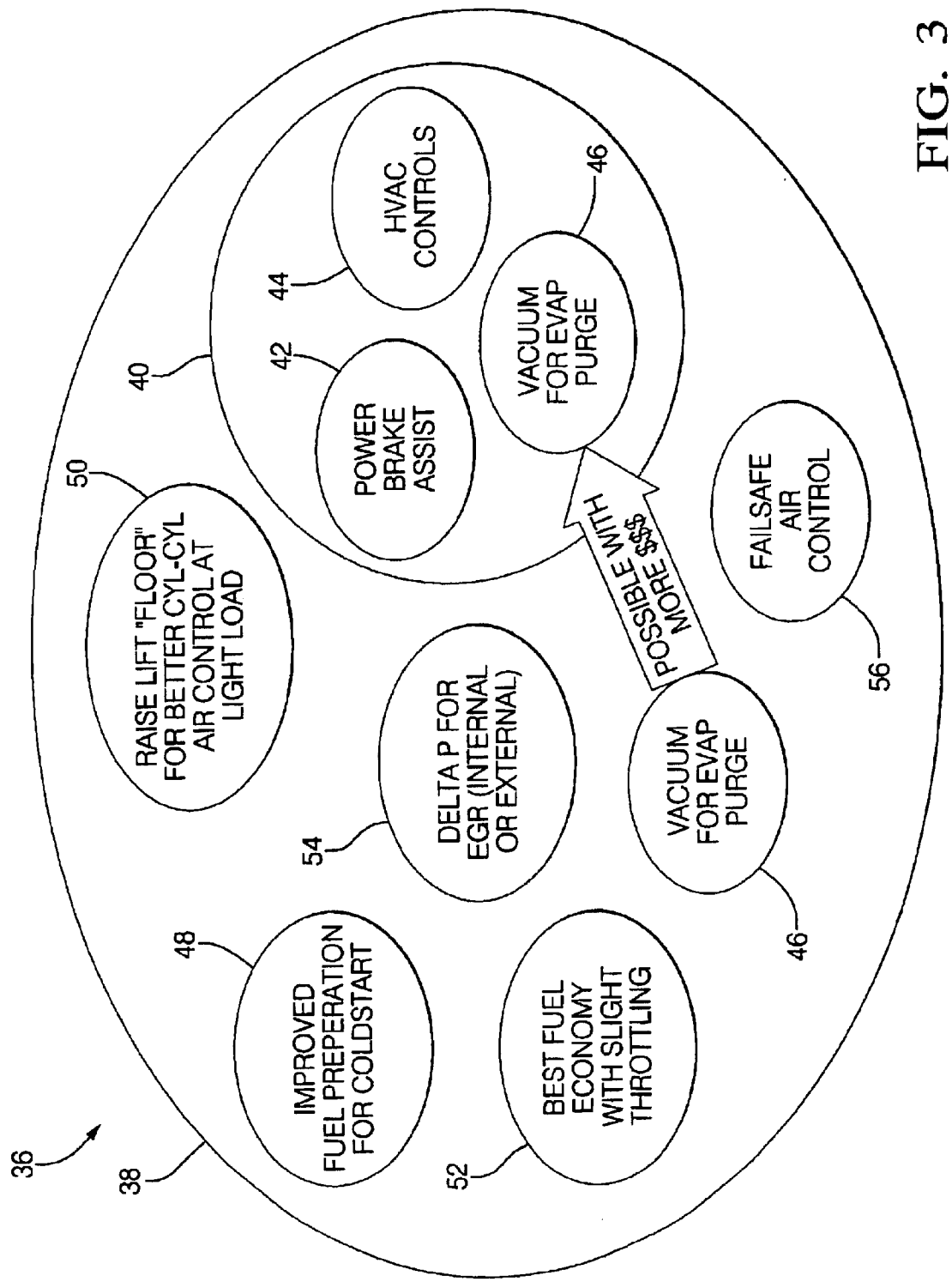
FIG. 3 is a diagram showing various engine and automotive functions which either require or are conventionally adapted for vacuum actuation.

Referring to FIG. 3, in Venn diagram 36, regional boundary 38 encompasses automotive and engine functions benefiting from an engine manifold vacuum system; regional boundary 40 encompasses those automotive functions which may be performed by an auxiliary vehicle vacuum pump in the absence of a manifold vacuum control system such as a system in accordance with the invention. Power brake vacuum assist 42 and HVAC control 44 are readily though expensively accommodated by an auxiliary vacuum pump, and power brakes may also be accommodated electrically without vacuum assist. Vacuum purge 46 of a fuel tank emissions canister might also be accommodated at a cost of more vehicle expense and complexity.

The functions within region 38 but outside of region 40 are engine functions requiring manifold vacuum and cannot be accommodated by either engine 12 in FIG. 1 or an auxiliary vacuum pump. Functions 48, 50, and 52 may each be optimized when the engine intake valves are operated at a slightly higher lift permitted by the presence of a slight vacuum in the manifold.

Function 48 refers to improving atomization of fuel when an engine is cold, which improves fuel efficiency and reduces tailpipe emissions.

Function 50 refers to improving the uniformity of air and fuel flow to the cylinders. With no manifold vacuum, under low load conditions the valves may be nearly closed; small absolute differences in manufacture or wear of valves can cause large percentage differences in fueling and even torque pulses in an engine. Providing a manifold vacuum requires a higher valve lift for the same flow, thereby increasing the open area of the valve throat and reducing the percentage flow differences between valves.

Function 52 refers to improving fuel economy by causing a slight amount of internal recycling of engine exhaust back through the opening intake valve at the end of the exhaust stroke. It is well known in the art that dilution of fresh fuel/air mix with exhaust gas can improve thermal efficiency and reduce NOX formation; indeed, such is the basis of external exhaust gas recirculation (EGR).

Functions 54, 46, and 56 also require a manifold vacuum.

Function 54 is the well-known external recirculation of a portion of the engine exhaust (EGR) into the intake manifold, as just recited, and requires a positive pressure differential between the exhaust and intake manifolds.

Function 46, noted above, is the stripping of collected adsorbed fuel from a charcoal-filled canister in communication with a vehicle fuel tank. Fuel vapors are collected by the canister during refueling and are stripped into the engine subsequently, most conveniently in response to intake manifold vacuum.

Function 56 refers to prevention of a full-torque condition in engine 12 of FIG. 1 in the event that the VVL system fails and the intake valves commence operation at maximum lift. The presence of vacuum control valve 16 in accordance with the invention permits the ECM to instantaneously convert engine control to conventional electronic throttle control of valve 16 by operator 31, thereby avoiding a runaway vehicle.

Figure 4:
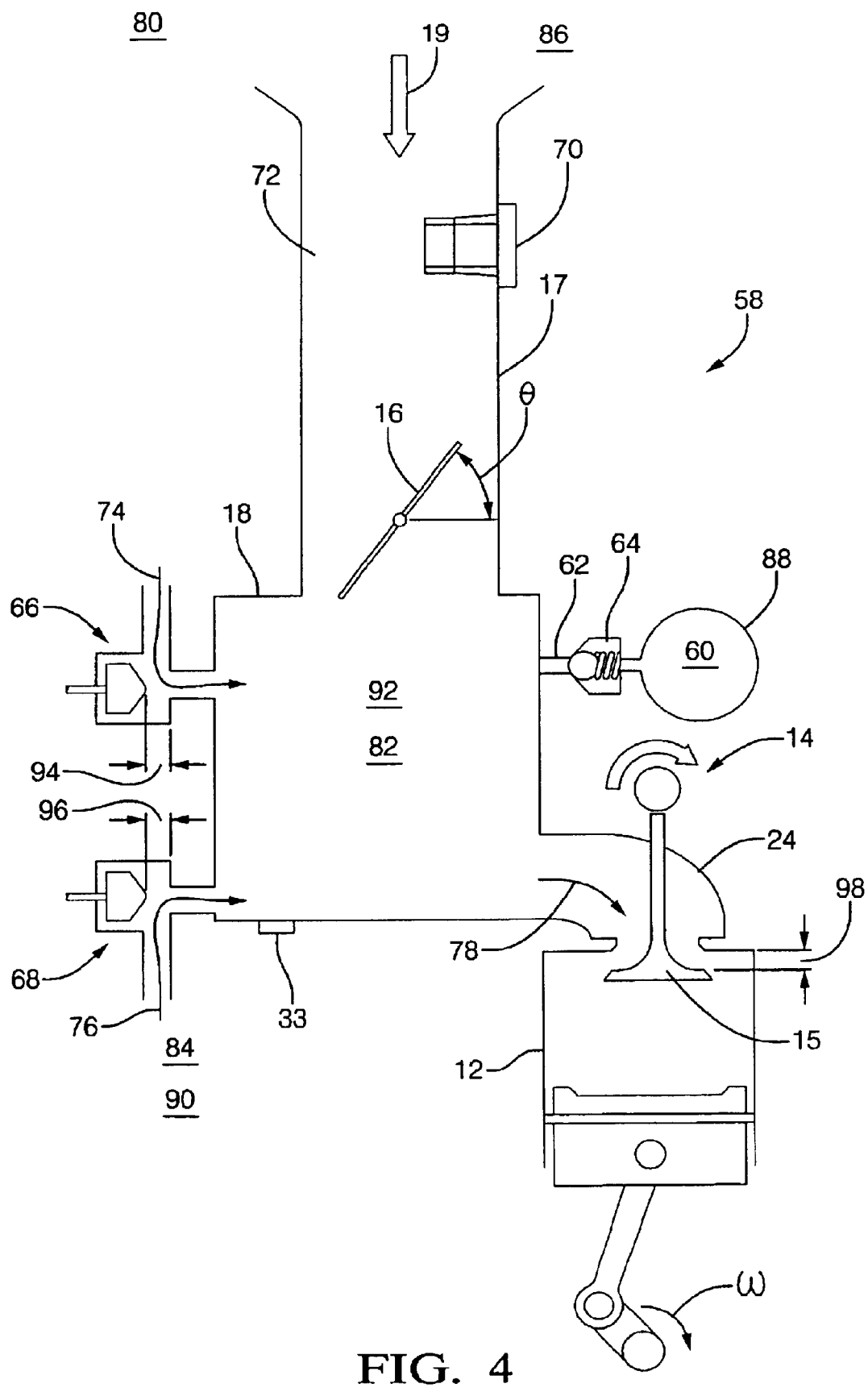
FIG. 4 is a schematic diagram of an engine similar to that shown in FIG. 2, showing the various flow relationships which may enter into a system for managing vacuum to an optimum level in such an engine.

Referring to FIG. 4, a vacuum management system 58 in accordance with the invention includes a brake booster vacuum assist 60 connected to manifold 18 via a vacuum tube 62 including a check valve 64; a canister purge valve 66; an EGR valve 68; and a mass flow sensor 70 in entrance 17 to manifold 18.

System 58 takes into account the following flows, pressures, temperatures, positions, ratios, and relationships:

$F_T$=throttle valve flow 72, or flow past valve 16
$F_P$=purge valve flow 74, or flow past valve 66
$F_E$=EGR valve flow 76, or flow past valve 68
$F_V$=intake valve flow 78, or flow past intake valves 15
$T_A$=temperature 80 of the atmosphere outside the engine
$T_M$=temperature 82 within manifold 18
$T_E$=exhaust gas temperature 84
$P_A$=atmospheric pressure 86
$P_B$=brake booster pressure 88
$P_E$=exhaust gas pressure 90
$P_M$=manifold pressure 92
$\omega$=engine speed
$\theta$=position of vacuum control valve 16
$X_P$=position 94 of purge valve 66
$X_E$=position 96 of EGR valve 68
I=lift 98 of intake valves 15

Thus:

$$F_V = F_T + F_E + F_P \tag{Eq.1}$$

$$= f(P_M, \omega, I, T_M) \tag{Eq. 1a}$$

Flow across intake valve 15 is the sum of flows across vacuum control valve 16, EGR valve 68, and purge valve 66, and is a function of manifold pressure, engine speed, intake valve lift, and manifold temperature.

$$F_T = f((P_M/P_A), \theta, T_M) \tag{Eq. 2}$$

Flow across vacuum control valve 16 is a function of pressure drop across valve 16, the position of valve 16, and the manifold temperature.

$$F_E = f((P_M/P_E), X_E, T_E) \tag{Eq. 3}$$

Flow across EGR valve 68 is a function of pressure drop across valve 68, the position of valve 68, and the temperature of the exhaust gas.

$$F_P = f((P_M/P_A), X_P, T_M) \tag{Eq. 4}$$

Flow across purge valve 66 is a function of pressure drop across valve 66, the position of valve 66, and the manifold temperature.

$$P_{M\_DESIRED} = f(P_B, F_{E\_DESIRED}, F_{P\_DESIRED}) \tag{Eq. 5}$$

The desired manifold pressure (vacuum) is a function of brake booster pressure 88, the desired EGR flow 76, and the desired purge flow 74.

$$F_{T\_DESIRED} = F_{V\_DESIRED} - (F_E + F_P) \tag{Eq. 6}$$

The desired flow across valve 16 equals the desired flow across intake valve 15 minus the flows 76,74 across EGR valve 68 and purge valve 66.

$$\Theta_{DESIRED}=f((P_{M\_DESIRED}/P_A), F_{T\_DESIRED}) \quad (Eq. 7)$$

The desired angular position of valve 16 is a function of the ratio of the desired manifold pressure to atmospheric pressure and the desired flow across valve 16.

For simplicity, ECM 20 is omitted from FIG. 4; however, it should be understood that ECM 20 is in communication with manifold pressure sensor 33 and with similar appropriate means (not shown) for measuring and transmitting $T_A$, $T_M$, $T_E$, $P_A$, $P_B$, $P_E$, $\omega$, $\theta$, $X_P$, $X_E$, and I to ECM 20.

In a control method in accordance with the invention, all of the above relationships are measured on a test engine under simulated use conditions in an engine laboratory, and the relationships are numerically quantified and mapped, primarily for optimum fuel efficiency. From these data, algorithms are developed in known fashion and programmed into ECM 20.

The primary objective of vacuum management system 58 is to provide optimum flow across intake valves 15 at an optimum manifold pressure, $P_{M\_DESIRED}$, at any given time, taking into account all of the above factors and relationships. The ECM algorithm considers all of the above parameters, decides on an engine condition based primarily on load (inputted by operator 31), engine speed, and manifold temperature, and establishes a height of valve lift 98 and a desired flow across valves 15, $F_{V\_DESIRED}$, for those conditions. The algorithm then establishes the desired air flow 72 across vacuum control valve 16, $F_{T\_DESIRED}$, in accordance with Eqs. 6 and 1, at the desired manifold pressure, $P_{M\_DESIRED}$, and sets the position $\theta$ of valve 16 in accordance with the parametric maps provided from the laboratory determinations. As engine conditions change, for example, when purging of the fuel canister is complete and valve 66 is closed, ECM 20 automatically varies the lift of valves 15 and the position $\theta$ of vacuum control valve 16 to maintain the optimum flow and manifold pressure.

A vacuum management system in accordance with the invention, such as system 58, provides insurance against an inadvertent full-torque event. Engines throttled solely by VVL means, like engine 12 in FIG. 1, are vulnerable to unexpected full-torque conditions if the VVL control system fails and the intake valves assume a full-lift mode. The presence of vacuum control valve 16 in accordance with the invention permits ECM 20 to be programmed to switch throttle control to valve 16, responsive to pedal input from operator 31 in essentially a conventional engine operating mode, until the VVL control means can be repaired.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. In an internal combustion engine having a primary throttle means including variable lift mean for intake valves of said engine, an intake manifold for conveying air to combustion cylinders through the intake valves, a pressure sensor disposed in the intake manifold, a secondary throttle means disposed at an inlet to the intake manifold, an exhaust recirculation valve connected to the intake manifold, a fuel emissions canister purge valve connected to said intake manifold, and a programmable engine control module connected to the variable lift means and to the pressure sensor and to the secondary throttle means for controlling the variable lift means and the secondary throttle means, a method for providing a desired flow of air through the intake valves at a desired pressure in the manifold, comprising the steps of:

a) first determining a plurality of engine operating conditions, including load demand by an operator;

b) second determining an optimum lift for said intake valves, an optimum manifold pressure, a position of said secondary throttle means, a desired position of said exhaust gas recirculation valve, and a desired position of said canister purge valve, responsive to said determined engine operating conditions, to yield said optimum manifold pressure;

c) setting said intake valves at said optimum lift and said secondary throttle means at said determined position to provide the desired flow of air through the intake valves at the desired pressure in the manifold;

d) setting said exhaust gas recirculation valve at said desired position; and e) setting said canister purge valve at said desired position.

2. A method for controlling torque at optimal fuel efficiency in an internal combustion engine having controllably variable intake valve lift means and an intake manifold for providing air to said intake valves, comprising the steps of:

a) providing a vacuum control valve at an entrance to said intake manifold;

b) providing an exhaust recirculation valve and a fuel emissions canister purge valve connected with said intake manifold;

c) determining an optimum intake valve lift optimum manifold pressure, desired position of said exhaust recirculation valve, and desired position of said fuel emissions canister purge valve to provide an optimum air flow across said intake valves;

d) setting said intake valves at said optimum lift;

e) setting said exhaust recirculation valve and said purge valve to said desired positions; and f) varying said vacuum control valve to provide said optimum manifold pressure and at least a portion of said optimum air flow.

3. A method in accordance with claim 2 wherein said optimum air flow includes flows through said purge valve and said vacuum control valve.

4. A method in accordance with claim 1 further comprising the step of operating the intake valves at a higher lift due to the pressure in the manifold, wherein the atomization of the fuel is improved.

5. A method in accordance with claim 1 further comprising the step of operating the intake valves at a higher lift due to the pressure in the manifold, wherein the uniformity of air and fuel flow to the cylinders is improved.

6. A method in accordance with claim 1 further comprising the step of allowing the engine control module to convert engine control to the secondary throttle means.

7. A method in accordance with claim 2 further comprising the step of operating the intake valves at a higher lift due to the pressure in the manifold, wherein the atomization of the fuel is improved.

8. A method in accordance with claim 2 further comprising the step of operating the intake valves at a higher lift due to the pressure in the manifold, wherein the uniformity of air and fuel flow to the cylinders is improved.

9. A method in accordance with claim 2 further comprising the step of converting engine control to the vacuum control valve.

* * * * *